(12) United States Patent
Jakkula et al.

(10) Patent No.: US 7,279,018 B2
(45) Date of Patent: Oct. 9, 2007

(54) FUEL COMPOSITION FOR A DIESEL ENGINE

(75) Inventors: Juha Jakkula, Kerava (FI); Pekka Aalto, Porvoo (FI); Vesa Niemi, Porvoo (FI); Ulla Kiiski, Hamari (FI); Jouko Nikkonen, Hamari (FI); Seppo Mikkonen, Porvoo (FI); Outi Piirainen, Helsinki (FI)

(73) Assignee: Fortum Oyj, Espoo (FI)

( * ) Notice: Subject to any disclaimer, the term of this patent is extended or adjusted under 35 U.S.C. 154(b) by 0 days.

(21) Appl. No.: 10/655,798

(22) Filed: Sep. 5, 2003

(65) Prior Publication Data

US 2004/0055209 A1   Mar. 25, 2004

Related U.S. Application Data

(60) Provisional application No. 60/408,302, filed on Sep. 6, 2002.

(51) Int. Cl.
*C10L 1/32* (2006.01)
*C10L 1/10* (2006.01)

(52) U.S. Cl. ............ 44/301; 44/302; 44/451; 44/457; 44/388; 585/14

(58) Field of Classification Search ............ 44/300, 44/451, 447, 388, 301, 302; 585/14
See application file for complete search history.

(56) References Cited

U.S. PATENT DOCUMENTS

| 4,992,605 A | 2/1991 | Craig et al. |
| 5,578,090 A | 11/1996 | Bradin et al. |
| 5,705,722 A | 1/1998 | Monnier et al. |
| 5,814,109 A * | 9/1998 | Cook et al. ............ 44/300 |

FOREIGN PATENT DOCUMENTS

| DE | 41 16 905 C1 | 8/1992 |
| FI | 95391 | 1/1996 |
| FI | SE 9700149 | 6/1997 |
| GB | 2 090 661 A | 7/1982 |
| WO | WO95/25152 A1 | 9/1995 |
| WO | WO98/56876 A1 | 12/1998 |
| WO | WO 01/49812 A1 | 7/2001 |
| WO | WO 03/022960 A2 | 3/2003 |

OTHER PUBLICATIONS

XP-002261526.—SE9700149—Aug. 1997.
Database WPI, Week 200357, Derwent Publication Ltd., Class D23, An 1997-488372 & SE520633 C2 (Neste Oy) . Abstract. 1997.

* cited by examiner

*Primary Examiner*—Cephia D. Toomer
(74) *Attorney, Agent, or Firm*—Birch Stewart Kolasch Birch

(57) ABSTRACT

The invention is directed to a fuel composition for diesel engines. The fuel composition comprises 0.1-99% by weight of a component or a mixture of components produced from biological raw material originating from plants and/or animals and/or fish. The fuel composition comprises 0-20% of components containing oxygen. Both components are mixed with diesel components based on crude oil and/or fractions from Fischer-Tropsch process.

7 Claims, No Drawings

FUEL COMPOSITION FOR A DIESEL ENGINE

TECHNICAL FIELD

The present invention relates to a fuel composition for diesel engines, comprising components based on vegetable oil and/or animal fat and/or fish oil, diesel components based on crude oil and/or fractions from Fischer-Tropsch process, and optionally components containing oxygen.

PRIOR ART

Currently used fuels for diesel engines mainly contain components from crude oil. The aim of the climate agreement of Kyoto is to eliminate detrimental influences due to human activities on the atmosphere, and thus on the climate. The EU has agreed on reducing emissions of carbon dioxide, methane and other greenhouse gases by eight percent until 2010, starting from the levels of 1990. One of the objects of the EU agricultural policy is to find uses for agricultural overproduction, and to increase the self-sufficiency for fuels. Accordingly, an EU directive is being prepared, demanding that at least two percent of the petrol and diesel fuel consumed in 2005 should be of biological origin. It is anticipated that one of the requirements of this directive is to increase the proportion of biocomponents to about six percent until 2010. The directive will be validated in all EU countries in the near future.

At the moment, the most common component of biological origin in fuels is rapeseed oil methyl ester, referred to as RME. RME is either used as such or as a mixture with fuels. Drawbacks of RME are its poor miscibility with diesel fuels, and, in comparison to a conventional diesel fuel (EN 590), particularly under low temperature conditions, its poor storage stability and poor performance at low temperatures. Moreover, it causes engine fouling and increases emissions of nitrogen oxides ($NO_x$). A by-product of the production process of RME is glycerol, which may become a problem when high amounts of the product are produced. Esters of other vegetable oils may be produced in similar manner, and methyl esters of fatty acids are generally known as FAMEs (fatty acid methyl ester). These FAMEs may be used in similar applications as the rapeseed oil methyl ester, but they also have a negative effect on the quality of the diesel fuel, particularly with respect to the performance thereof at low temperatures, and in addition, the use thereof in fuels increases the emissions of nitrogen oxides. In some cases FAME and RME cause higher particle emissions and smoke development of the cold driven engine.

Vegetable oils and animal fats may be processed to decompose the ester and/or fatty acid structure and to saturate the double bonds of the hydrocarbon chains, thus obtaining about 80 to 85% of n-paraffin product relative to the mass of the starting material. This product may be directly mixed with a diesel fuel, but a problem with the fuel so produced is its poor performance at low temperatures. In addition, n-paraffins having a carbon number of fatty acids are waxy with a high solidification point, typically above +10° C., thus limiting the use of these compounds in diesel fuels at least at low temperatures.

WO 2001049812 discloses a method for producing a diesel fuel with a molar ratio of iso-paraffins to n-paraffins of at least 21:1. In the method, a feed stock containing at least 50% of $C_{10}$-paraffins is contacted with a catalyst in the isomerization reaction zone.

WO 2001012581 discloses a method for producing methyl esters useful as biological diesel fuel, wherein mixtures of fatty acids and triglycerides are esterified in one phase. In this method, a solution is formed from fatty acids, triglycerides, alcohol, acid catalyst and co-solvents at a temperature below the boiling point of the solution. A co-solvent is used in amounts to provide a single phase, then the solution is maintained for a period of time sufficient for the acid catalyzed esterification of the fatty acids to take place. Thereafter, the acid catalyst is neutralized, a base catalyst is added to transesterify the triglycerides, and finally, the esters are separated from the solution. Thus a biofuel containing esters is obtained, having a glycerol content of less than 0.4% by weight U.S. Pat. No. 6,174,501 presents a method for producing oxidized diesel fuel of biological origin. This oxidized biological diesel fuel comprises a mixture of transesterified triglycerides.

FI 100248 describes a two-step process for producing middle distillate from vegetable oil by hydrogenating fatty acids of the vegetable oil, or triglycerides, to give n-paraffins, and then by isomerizing the n-paraffins to give branched-chain paraffin.

Any gases, liquid droplets and solid particles present in the atmosphere in amounts being hazardous to human health and/or having a detrimental effect on animals, plants and different materials, are considered as air pollutants. Air pollution mainly originates from three main emission sources, i.e. the industry, energy production, and traffic.

The harmfulness of particle emissions is caused by the substances and compounds they carry, such as heavy metals and other carcinogenic and mutagenic compounds. Particles present in exhaust gases are small and thus hazardous to health.

Greenhouse gases allow for the penetration of the radiation from the sun to reach the earth, preventing, however, the thermal radiation from escaping from the earth back to space. They thus contribute to the warming of the earth. One of the most significant greenhouse gases is carbon dioxide released, for instance, during the combustion of fossil fuels.

Nitrogen oxides are acidifying compounds. This acidification may, for instance, lead to plant damages and species changes in surface waters. Nitrogen oxides may also react with oxygen to give ozone. This phenomenon contributes particularly to air quality in cities.

As the above teachings indicate, there is a need for a high quality fuel composition for diesel engines containing components of biological origin and also meeting the quality requirements for diesel fuels under low temperature operation conditions. Moreover, the fuel should be more environmentally friendly than prior art solutions.

GENERAL DESCRIPTION OF THE INVENTION

The object of the invention is to provide a more environmentally friendly fuel composition for diesel engines containing components of biological origin, and also meeting the quality requirements for diesel fuels under low temperature conditions.

The fuel composition for diesel engines of the invention, containing components of biological origin, comprises at least one component produced from a biological starting material obtained from plants, animals or fish, diesel components based on crude oil and/or fractions from Fischer-Tropsch process, and optionally components containing oxygen.

The characteristic features of the fuel composition for diesel engines containing components of biological origin are presented in the appended claims.

DETAILED DESCRIPTION OF THE INVENTION

It was surprisingly found that the diesel fuel composition of the invention, containing components of biological origin, also meets the quality requirements for diesel fuels under low temperature conditions. The composition of the diesel fuel of the invention comprises the following:

a) 0.1 to 99% by volume, preferably 0.1 to 80% by volume of a component or a mixture of components produced from biological raw material originating from plants and/or animals and/or fish;

b) 0 to 20% by volume of components containing oxygen selected from the group consisting of aliphatic alcohols such as methanol and ethanol, ethers, fatty acid esters such as methyl and ethyl esters, water, and mixtures containing the same;

both components a) and b) being mixed as an emulsion or dissolved in diesel components based on crude oil and/or fractions from Fischer-Tropsch process.

Component a) produced from biological raw material originating from plants and/or animals and/or fish, referred to as the biological component in the present specification, is obtained by hydrogenating and decomposing fatty acids and/or fatty acid esters to give a hydrocarbon having a carbon number of 6-24, typically n-paraffin as the product having a carbon number of 12-24, and optionally by isomerizing the hydrocarbon, typically n-paraffin, thus obtained to give isoparaffin. The hydrocarbon is preferably isomerized.

The biological raw material originating from plants and/or animals and/or fish is selected from the group consisting of vegetable oils, animal fats, fish oils and mixtures thereof containing fatty acids and/or fatty acid esters. Examples of suitable materials are wood-based and other plant-based fats and oils such as rapeseed oil, colza oil, canola oil, tall oil, sunflower oil, soybean oil, hempseed oil, olive oil, linseed oil, mustard oil, palm oil, peanut oil, castor oil, coconut oil, as well as fats contained in plants bred by means of gene manipulation, animal-based fats such as lard, tallow, train oil, and fats contained in milk, as well as recycled fats of the food industry and mixtures of the above.

The basic component of a typical vegetable or animal fat is triglyceride i.e. a triester of glycerol and three fatty acid molecules having the structure presented in the following formula I:

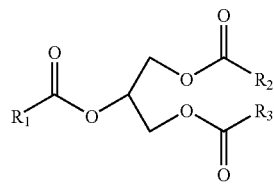

(I)

where $R_1$, $R_2$, and $R_3$ are hydrocarbon chains, and $R_1$, $R_2$, and $R_3$ may be saturated or unsaturated $C_6$-$C_{24}$ alkyl groups. The fatty acid composition may vary considerably in biological raw materials of different origin.

n-paraffin, iso-paraffin or mixtures thereof produced from the biological raw material may be used as a diesel fuel component in accordance with the properties desired for the diesel fuel. Fractions from Fischer-Tropsch-process typically contain high levels of n-paraffin and, optionally, they may be isomerized either simultaneously during the processing of the component of biological origin or separately therefrom, or they may be used as such.

The biological component may be produced, for instance, with a process comprising at least two steps and optionally utilizing the counter-current operation principle. In the first hydrodeoxygenation step of the process, optionally running counter-current, the structure of the biological raw material is broken, compounds containing oxygen, nitrogen, phosphor and sulphur as well as light hydrocarbons as gas are removed, and thereafter, olefinic bonds are hydrogenated. In the second isomerization step of the process, optionally running counter-current, isomerization is carried out to give branched hydrocarbon chains, thus improving the low temperature properties of the paraffin.

Biological raw material originating from plants, animals or fish and containing fatty acids and/or fatty acid esters, selected from vegetable oils, animal fats, fish oils and mixtures thereof, is used as the feed stock.

High quality hydrocarbon component of biological origin, particularly useful as a component of a diesel fuel, as an isoparaffinic solvent and as a lamp oil, is obtained as the product having a high cetane number that may even be higher than 70. Also, with a turbidity point lower than −30° C. a cetane number higher than 60 can still be achieved. The process can be adjusted according to the desired cetane number and turbidity point.

Advantages of the diesel fuel composition of the present invention include superior performance at low temperatures and an excellent cetane number compared to solutions of prior art using FAME-based components like RME. Problems associated with the performance at low temperatures may be avoided by isomerizing waxy n-paraffins having a carbon number comparable with that of fatty acids to give isoparaffins. The properties of the products thus obtained are excellent, especially with respect to diesel applications, the n-paraffins typically have cetane numbers higher than 70, and isoparaffins higher than 60, and thus they have an improving effect on the cetane number of the diesel pool, which clearly makes them more valuable as diesel components. Moreover, the turbidity point of the isomerized product may be adjusted to the desired level, for example below −30° C., whereas the corresponding value is about 0° C. for RME and more than +15° C. for n-paraffins. Table 1 below compares the properties of an isomerized biological component, RME, and a commercial diesel fuel.

TABLE 1

| Product | Density (kg/m³) | Cetane number | Turbidity point (° C.) |
|---|---|---|---|
| Isomerized biological component | <800 | ≧60 | ≦−30 |
| RME | ~880 | ~50 | ~0 |
| Diesel fuel EN 590 | 820-845 | ≧51 | 0 to −15 |

Fouling of engines is considerably diminished and the noise level is clearly lower when using the diesel fuel composition of the invention in comparison with similar prior art fuels of biological origin containing FAME components, and further, the density of the composition is lower. The composition does not require any modifications of the automobile technology or logistics. Higher energy content per unit volume may be mentioned as a further advantage compared to RME.

The properties of the diesel fuel composition of biological origin according to the invention correspond to those of a high quality diesel fuel based on crude oil, it is free of aromates and, in contrast to FAME, it leaves no impurity residues.

Nitrogen oxide emissions due to the fuel composition of the invention are lower than those from a similar FAME-based product, and further, the particle emissions are clearly lower, and the carbon portion of the particles is smaller. These significant improvements in the emissions of the fuel composition of biological origin are environmentally very important.

The invention will now be illustrated by means of the following examples without intending to limit the scope thereof.

EXAMPLES

Example 1

The following Table 2 compares the emission characteristics of a conventional diesel fuel used in Europe in summer, EN 590 (DI), to those of a composition containing 60% by volume of hydrogenated and isomerized tall oil (TOFA), and 40% by volume of the European summer diesel fuel EN 590.

TABLE 2

| Characteristic | Unit | 60% b.v. TOFA + 40% b.v. DI | DI |
|---|---|---|---|
| Turbidity point | ° C. | −15 | −8 |
| Cetane number | — | 61.2 | 55.9 |
| Aromates | % b.w. | 8.7 | 19.2 |
| Total aromates (IP391) | % b.v. | 9.1 | 20.0 |
| Polyaromates (IP391) | % b.v. | 0.8 | 1.6 |
| n-paraffins | % b.w. | 14.7 | 24.5 |
| i-paraffins | % b.w. | 34.2 | 26.1 |
| Naphthenes | % b.w. | 42.4 | 30.2 | b.w. = by weight
b.v. = by volume

Example 2

Table 3 below compares the emission characteristics of a high quality reformed crude oil based diesel fuel available on the Finnish market (DITC, produced by Fortum Oyj), to those of compositions containing 30% by volume of hydrogenated and isomerized tall oil (TOFA), and 70% by volume of DITC, or containing 30% by volume of tall oil methyl ester (MME), and 70% by volume of DITC.

TABLE 3

| Characteristic | Unit | DITC | 30% b.v. TOFA + 70% b.v. DITC | 30% b.v. MME 70% b.v. DITC |
|---|---|---|---|---|
| Cetane number | — | 51 | 57 | 48 |
| NO$_x$ emissions | % | | −1 to −4 | +3 |
| (compared to DITC) | | | | |
| Particles | % | | −3 | +22 |
| carbon | % | | −10 to −30 | 0 to −10 |
| PAH | % | | ±0 | ±0 |
| Combustion noise | | | decreases | ±0 | b.v. = by volume

The invention claimed is:

1. A Fuel composition for diesel engines comprising:
   a) 0.1-99% by volume of a component or a mixture of components produced from biological raw material originating from animals by hydrogenating and decomposing fatty acids and/or fatty acid esters to give hydrocarbons and isomerizing the hydrocarbons to give isoparaffins;
   b) 0-20% by volume of components containing oxygen selected from the group consisting of aliphatic alcohols, ethers, fatty acid esters, water and mixtures containing the same; both components a) and b) being mixed as an emulsion or dissolved in diesel components based on crude oil and/or fractions from Fischer-Tropsch process.

2. The fuel composition of claim 1, wherein the fuel composition comprises 0.1-80% by volume of a component or a mixture of components produced from biological raw material.

3. The fuel composition according to claim 1 or 2, wherein the biological raw material is selected from the group consisting of animal fats and mixtures thereof with vegetable oils.

4. The fuel composition according to claim 1, wherein the biological raw material is an animal-based fat, a fat contained in milk, a recycled fat of the food industry or a mixture of the above with at least one member selected from the group consisting of a wood-based fat or oil, another plant-based fat or oil, and a fat contained in plants bred by means of gene manipulation.

5. The fuel composition of claim 4, wherein the animal based fat or the recycled fat of the food industry is lard, tallow or train oil, and that the wood-based or other plant-based fat or oil is rapeseed oil, colza oil, canola oil, tall oil, sunflower oil, soybean oil, hempseed oil, olive oil, linseed oil, mustard oil, palm oil, peanut oil, castor oil or coconut oil.

6. The fuel composition according to claim 1, wherein the component produced from biological raw material is isoparaffin having a carbon number of 12-24.

7. The fuel composition of claim 1, wherein said biological raw material in step a) further comprises biological raw material originating from plants.

* * * * *

(12) EX PARTE REEXAMINATION CERTIFICATE (9162nd)
United States Patent
Jakkula et al.

(10) Number: US 7,279,018 C1
(45) Certificate Issued: Jul. 31, 2012

(54) FUEL COMPOSITION FOR A DIESEL ENGINE

(75) Inventors: Juha Jakkula, Kerava (FI); Pekka Aalto, Porvoo (FI); Vesa Niemi, Porvoo (FI); Ulla Kiiski, Hamari (FI); Jouko Nikkonen, Hamari (FI); Seppo Mikkonen, Porvoo (FI); Outi Piirainen, Helsinki (FI)

(73) Assignee: Neste Oil Oyj, Espoo (FI)

Reexamination Request:
No. 90/010,549, May 22, 2009

Reexamination Certificate for:
Patent No.: 7,279,018
Issued: Oct. 9, 2007
Appl. No.: 10/655,798
Filed: Sep. 5, 2003

Related U.S. Application Data
(60) Provisional application No. 60/408,302, filed on Sep. 6, 2002.

(51) Int. Cl.
*C10L 1/10* (2006.01)
*C10L 1/32* (2006.01)

(52) U.S. Cl. .............................. 44/301; 44/302; 44/388; 44/451; 44/457; 585/14

(58) Field of Classification Search ...................... 44/301
See application file for complete search history.

(56) References Cited

To view the complete listing of prior art documents cited during the proceeding for Reexamination Control Number 90/010,549, please refer to the USPTO's public Patent Application Information Retrieval (PAIR) system under the Display References tab.

*Primary Examiner* — Jerry D. Johnson

(57) ABSTRACT

The invention is directed to a fuel composition for diesel engines. The fuel composition comprises 0.1-99% by weight of a component or a mixture of components produced from biological raw material originating from plants and/or animals and/or fish. The fuel composition comprises 0-20% of components containing oxygen. Both components are mixed with diesel components based on crude oil and/or fractions from Fischer-Tropsch process.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-7 are cancelled.

* * * * *